United States Patent

Sunvold et al.

Patent Number: 6,093,418
Date of Patent: Jul. 25, 2000

[54] METHOD FOR REMOVING NITROGENOUS WASTE PRODUCTS FROM ANIMALS WITH HEPATIC DISEASE

[75] Inventors: Gregory Dean Sunvold, Eaton; Mark A. Tetrick; Gregory A. Reinhart, both of Dayton, all of Ohio

[73] Assignee: The Iams Company, Dayton, Ohio

[21] Appl. No.: 09/154,119

[22] Filed: Sep. 16, 1998

Related U.S. Application Data

[60] Provisional application No. 60/059,045, Sep. 16, 1997.

[51] Int. Cl.$^7$ .................................................. A23K 1/165
[52] U.S. Cl. ........................ 424/442; 424/438; 424/439; 426/2; 426/805; 514/777
[58] Field of Search .............................. 426/2, 805, 630, 426/635, 658; 514/54, 777–783; 424/438, 439, 442

[56] References Cited

U.S. PATENT DOCUMENTS

| | | |
|---|---|---|
| 4,898,879 | 2/1990 | Madsen et al. |
| 5,616,569 | 4/1997 | Reinhart . |
| 5,776,524 | 7/1998 | Reinhart . |

OTHER PUBLICATIONS

Lewis et al., "Small Animal Clinical Nutrition III" pp. 7–55 to 7–59 (1987).

Younes et al., "Fermentable Fibers or Oligosaccharides Reduce Urinary Nitrogen Excretion by Increasing Urea Disposal in the Rat Cecum" pp. 1010–1016, 1995 American Institute of Nutrition.

Willard et al., "Effects of dietary supplementation of fructo–oligosaccharides on small intestinal bacterial overgrowth in dogs" Am J Vet Res. vol. 55 No. 5 (May 1994) pp. 654–659.

Howard et al., "Effect of fermentable fiber consumption by the dog on nitrogen balance and fecal microbial nitrogen excretion" FASEB Journal V. 10 p. A257 (1996).

Sunvold et al, "Dietary Fiber for Dogs: IV. IN Vivo Fermentation of Selected Fiber Sources by Dog Fecal Inoculum and In Vitro Digestion and Metabolism of Fiber–Supplemented Diets" Journal of Animal Science pp. 1099–1109 (1995).

Diez et al., "Influence of a blend of fructo–oligosaccharides and sugar beet fiber on nutrient digestibility and plasma metabolite concentrations in healthy Beagles" American Journal of Veterinary Research, pp. 1238–1242 (1997).

*Primary Examiner*—Neil S. Levy
*Attorney, Agent, or Firm*—Killworth, Gottman, Hagan & Schaeff LLP

[57] ABSTRACT

A process for removing nitrogenous wastes from animals with hepatic disease is provided and includes the steps of feeding an animal a diet consisting essentially of a pet food composition containing fermentable fibers which have an organic matter disappearance of from about 15 to about 60 percent when fermented by fecal bacteria for a 24 hour period, said fibers being present in amounts from about 1 to about 11 percent by weight of supplemental total dietary fiber, and maintaining the animal on that diet for a sufficient period of time to allow the fermentable fibers to ferment in the colon of the animal to enhance bacterial activity and provide an acidic environment in said colon for trapping the nitrogenous wastes for excretion through the feces of the animal.

24 Claims, 1 Drawing Sheet

METHOD FOR REMOVING NITROGENOUS WASTE PRODUCTS FROM ANIMALS WITH HEPATIC DISEASE

CROSS REFERENCE TO RELATED APPLICATIONS

This patent application claims the benefit of U.S. Provisional Application Ser. No. 60/059,045, filed Sep. 16, 1997.

BACKGROUND OF THE INVENTION

This invention relates to a pet food composition and process for removing nitrogenous wastes from the blood of companion animals, such as dogs and cats, with hepatic disease, and more particularly to such a process involving the use of a pet food composition containing fermentable fibers.

In animals suffering from liver (hepatic) disease, the ability of the liver to convert ammonia to urea is compromised, and blood levels of ammonia build up causing hyperammonemia. Ammonia is a principal breakdown product of amino acids in the liver. Amino acids can be derived from the breakdown of body protein (muscle, organs, etc.) as well as dietary protein. Liver disease is clinically evident by the detection of abnormally high levels of ammonia in the blood. High blood ammonia levels are thought to contribute to the encephalopathy or loss of mental function, lethargy, and disorientation associated with hepatic disease. High blood ammonia levels also result in increased respiration, nausea, and vomiting in the affected animal. Dietary means to control blood ammonia levels would be of benefit in helping the animal deal with this life threatening disease.

Current therapies for liver disease include severe side effects to the animal. One therapy involves the use of antibiotics to virtually sterilize the intestinal environment. This is done to eliminate bacterial generation of ammonia and other toxins. The major side effect of this therapy is that beneficial intestinal bacteria in the animal are also killed. The beneficial bacteria are important to a healthy intestine because they produce an energy source for the intestine, produce vitamins, enhance immunity, and prevent pathogen overgrowth. Another therapy involves the use of lactulose, a laxative agent. A severe side effect of lactulose is excessive diarrhea. A third therapy involves feeding the animal a diet which severely restricts the animal's intake of protein. However, such low protein diets result in muscle catabolism and decreased immune function in the animal. Thus, these current therapies are less than ideal for treating liver disease.

Accordingly, a need exists for an easy to administer therapy for animals suffering from liver disease which avoids the adverse side effects of current therapies.

SUMMARY OF THE INVENTION

The present invention meets that need by providing an easy to administer diet which results in the reduction of the load of ammonia on the liver of an animal by placing more waste products of nitrogen metabolism into the large intestine and thus lessening the damaging effects of this toxic compound on the animal.

The present invention counteracts the buildup of toxic nitrogenous wastes such as ammonia by feeding the animal a diet containing fermentable fibers which have an organic matter disappearance of from about 15 to about 60 percent when fermented by fecal bacteria for a 24 hour period. The fibers are present in the diet in amounts of from between about 1 to about 11 percent by weight of supplemental total dietary fiber. By maintaining the animal on such a diet for a sufficient period of time to allow the fermentable fibers to ferment in the colon of the animal to enhance bacterial activity and provide an acidic environment in the colon for trapping such nitrogenous wastes, such wastes are then excreted through the feces of the animal.

The fermentable fibers in the diet have at least two beneficial effects. They trap nitrogenous waste products such as ammonia from the blood, and they provide an acidic environment in the lumen (inside) of the intestine which pulls in ammonia. These fermentable fibers avoid the negative side effects of the current therapies for treating liver disease because they enhance the intestinal health of the animal while removing ammonia from the blood.

Preferably, the pet food composition contains from about 2 to about 9 weight percent of supplemental total dietary fiber of fermentable fibers. More preferably, the pet food composition contains from about 3 to about 7 weight percent of supplemental total dietary fiber of fermentable fibers. Most preferably, the pet food composition contains from about 4 to about 7 weight percent of supplemental total dietary fiber of fermentable fibers.

Preferably, the fermentable fibers have an organic matter disappearance of 20 to 50 percent. More preferably, the fermentable fibers have an organic matter disappearance of 30 to 40 percent.

In addition, the fermentable fibers are preferably selected from the group consisting of beet pulp, gum arabic, gum talha (a form of gum arabic), psyllium, rice bran, carob bean gum, citrus pulp, pectin, fructooligosaccharides, mannanoligosaccharides and mixtures thereof. More preferably, the fermentable fibers are selected from the group consisting of beet pulp, gum arabic, and fructooligosaccharides. Most preferably, the fermentable fibers comprise a blend of beet pulp, gum talha, and fructooligosaccharides. A preferred weight ratio of beet pulp to fructooligosaccharides in the fermentable fiber blend is from about 3:1 to 6:1, and most preferably 4:1. A preferred weight ratio of beet pulp to gum talha to fructooligosaccharide is 6:2:1.5.

The present invention also provides a process for lowering blood plasma ammonia concentrations in animals with hepatic disease and includes the step of feeding an animal a diet which consists essentially of a pet food composition which contains at least 18 wt % protein (DMB) and fermentable fibers which have an organic matter disappearance of from about 15 to about 60 percent when fermented by fecal bacteria for a 24 hour period, the fibers being present in amounts from about 1 to about 11 percent by weight of supplemental total dietary fiber.

Accordingly, it is a feature of the present invention to provide an easy to administer diet which results in the reduction of the load of ammonia on the liver of an animal by placing more waste products of nitrogen metabolism into the large intestine while avoiding the adverse side effects of prior therapies. This, and other features and advantages of the invention, will become apparent from the following detailed description, the accompanying drawings, and the appended claims.

DETAILED DESCRIPTION OF THE PREFERRED EMBODIMENT

Figure 1:
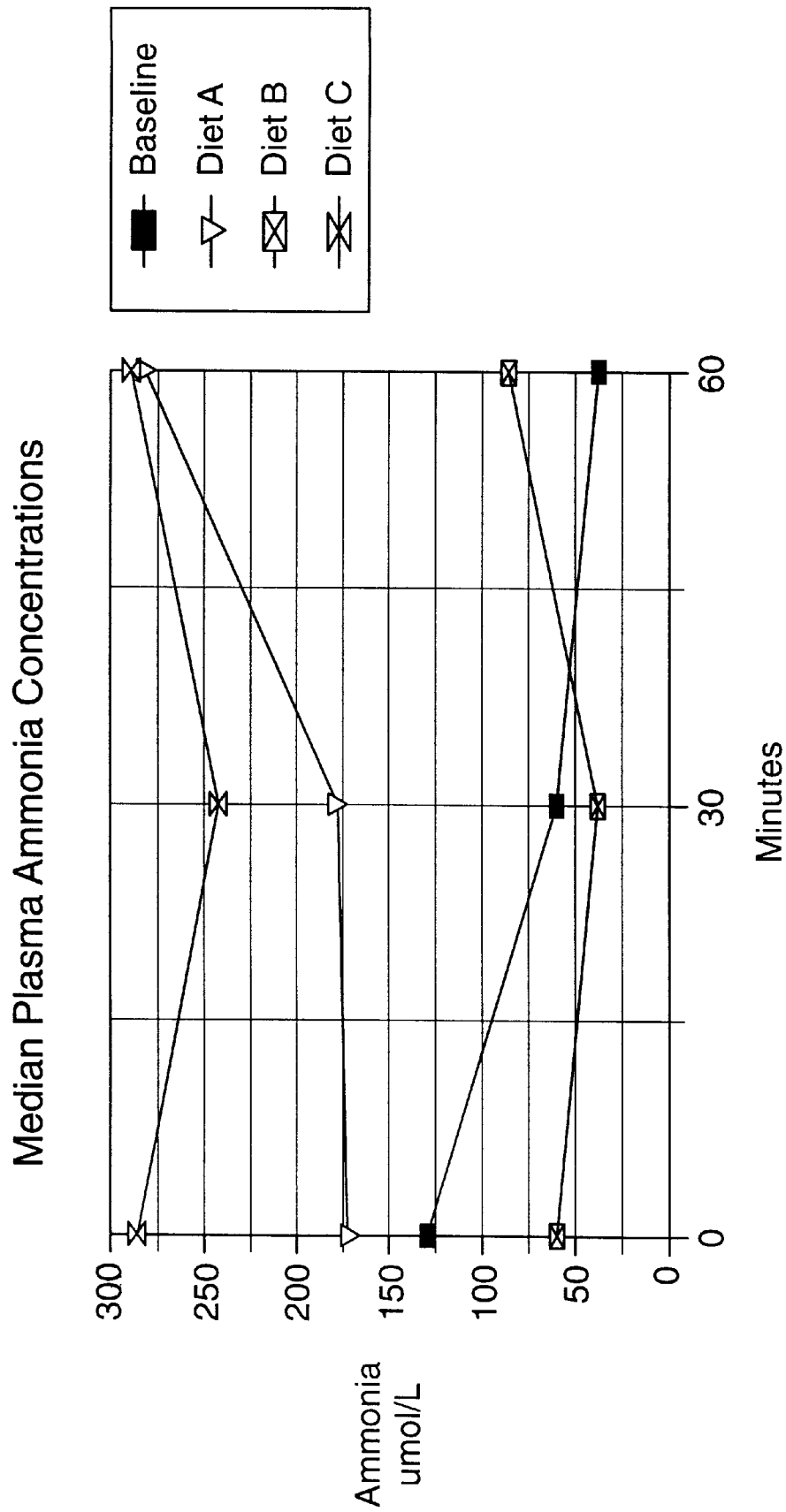
FIG. 1 is a graph of median blood plasma ammonia concentrations (in $\mu$mol/L) measured 0, 30, and 60 minutes after feeding for dogs fed one of four diets (identified as Baseline, Diet A, Diet B, and Diet C).

The present invention utilizes a pet food composition containing fermentable fibers which trap nitrogenous waste products such as ammonia from the animal's blood stream. The fermentable fibers also provide an acidic environment in the lumen of the animal's intestine which pulls in ammonia from the blood stream. Under normal circumstances, nitrogenous waste products such as ammonia passively diffuse from the blood into the intestine of an animal. In the presence of the fermentable fibers contained in the composition of the present invention, beneficial bacterial growth in the intestine is enhanced. As bacterial activity is enhanced, a greater amount of nitrogen in the form of ammonia is needed for their growth. This creates a concentration gradient whereby bacteria are actively pulling ammonia from the blood into the lumen of the intestine. This phenomenon is of benefit to the animal with liver disease because once ammonia is incorporated into the bacteria it is unlikely to be reabsorbed back into the blood stream. Such ammonia will ultimately be excreted in the feces of the animal.

In addition, the fermentable fibers in the composition of the present invention produce an acidic environment within the intestine as the bacteria use the fibers as a food source. The acidic environment occurs due to the production of short-chain fatty acids (SCFA) as the bacteria utilize the fibers. Within the lumen of the intestine, ammonia exists both as ammonia ($NH_3$) and its protonated form, ammonium ion ($NH_4^+$). As the environment becomes more acidic, the proportion of ammonia present as ammonium ion increases. This is also of benefit to the liver-diseased animal because ammonium ion is less able to be reabsorbed back into the blood than ammonia.

The present invention uses a pet food composition containing fermentable fibers which display certain organic matter disappearance percentages. The fermentable fibers used in the present invention have an organic matter disappearance (OMD) of from about 15 to about 60 percent when fermented by fecal bacteria in vitro for a 24 hour period. That is, from about 15 to about 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(\text{OM residue}-\text{OM blank})/\text{OM initial}]\} \times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol. 73:1099–1109.

The pet food composition can be any suitable pet food formula which also provides adequate nutrition for the animal. The composition may also be optimized for an animal suffering from hepatic disease. As there are multiple types of hepatic disease, the composition may vary within the following broad percentages. For example, a typical canine diet for use in the present invention may contain from about 18 to about 36% crude protein, from about 5 to about 26% fat, and from about 3 to about 25% total dietary fiber. However, no specific ratios or percentages of these or other nutrients are required.

Fermentable fibers which are useful in the present invention produce short chain fatty acids (SCFAs) within a range of from about 28 to about 85 mmol SCFA per 1000 Calories (kcals) of metabolizable energy (ME), and more preferably within a range of from about 42 to about 71 mmol SCFA per 1000 ME kcals. This equates to a composition which has a total fermentable fiber content which yields from about 100 to about 350 mmol SCFA/kg of diet.

Millimoles of SCFAs per 1000 metabolizable energy kilocalories are calculated by first calculating the total Calories of metabolizable energy (ME) in a given diet composition per kilogram of the composition. The number of grams per 1000 kcal ME may be derived from the first calculation. Then the grams, and thus millimoles, of the fermentable fiber components of the composition may be calculated.

The fermentable fiber of the present invention may be any fiber source which intestinal bacteria present in the animal can ferment to produce significant quantities of SCFAs. "Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides, mannanoligosaccharides and mixtures of these fibers.

The fermentable fibers are used in the pet food composition in amounts from about 1 to about 11 weight percent of supplemental total dietary fiber, preferably from about 2 to about 9 weight percent, more preferably from about 3 to about 7 weight percent, and most preferably from about 4 to about 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

In order that the invention may be more readily understood, reference is made to the following example, which is intended to be illustrative of the invention, but is not intended to be limiting in scope.

EXAMPLE

The performance of three different diets was studied to determine whether such diets could advantageously reduce the clinical signs of hepatic encephalopathy and improve clinicopathologic features in dogs with hepatic insufficiency. Eight dogs of various breeds were chosen for the study, each of the dogs exhibiting either physical, clinical, or clinicopathologic evidence of congenital hepatic insufficiency. Some of the dogs were fed one of the diets, had data recorded, then were switched to a different diet and had data recorded again. The results illustrated in FIG. 1 illustrate median blood plasma levels for animals on each of the diets.

For comparison (Baseline diet), some of the animals were fed a commercially-available protein restricted diet (Hill's Prescription Diet k/d®) which is recommended by the manufacturer for dogs with hepatic disease. The Baseline diet contains 14.6 wt % protein on a dry matter basis. The three test diets included fat and protein sources as well as a mix of vitamins and minerals. All three of the test diets contained about 21.5 wt % protein (±0.1%) on a dry matter basis. The only differences between the diets were: Diet A included 7.3 wt % cellulose as the source of supplemental total dietary fiber. Cellulose is substantially non-fermentable and is outside the scope of fermentable fibers used in the practice of the present invention. Diets B and C included 6.4 wt % beet pulp, 1.9 wt % gum arabic, and 1.5 wt % fructooligsaccharides as the source of supplemental total dietary fiber. Diet C also included 0.02 wt % yucca schidigera, a plant extract which has been asserted to be beneficial to animals. Diet B is an example of the present invention As shown in FIG. 1, median plasma ammonia concentrations were measured ($\mu$mol/L) at 0, 30, and 60 minutes after feeding for dogs which had been fed each of the baseline, and A, B, and C diets. For comparison, it would be expected that an animal having normal liver function would exhibit a median blood plasma ammonia concentration of between about 20–120 $\mu$mol/L.

Of the diets, only the Baseline diet and Diet B attenuated blood plasma ammonia levels to within the range of normal values. However, the Baseline diet contained only a restricted amount of protein, 14.6 wt % on a dry matter basis. The minimum recommended protein requirement for a canine diet to avoid muscle catabolism is about 18 wt % protein on a dry matter basis (MFCO adult maintenance minimum requirement). Thus, Diet B actually lowered blood plasma ammonia concentrations to at or near normal levels while maintaining the animals' nutritional requirements for protein.

While certain representative embodiments and details have been shown for purposes of illustrating the invention, it will be apparent to those skilled in the art that various changes in the methods and apparatus disclosed herein may be made without departing from the scope of the invention.

What is claimed is:

1. A process for removing nitrogenous wastes from a companion animal with hepatic disease comprising the steps of:
    feeding said companion animal a diet consisting essentially of a pet food composition containing fermentable fibers which have an organic matter disappearance of from about 15 to about 60 percent when fermented by fecal bacteria for a 24 hour period, said fibers being present in amounts from about 1 to about 11 percent by weight of supplemental total dietary fiber, and
    maintaining said animal on said diet for a sufficient period of time to allow said fermentable fibers to ferment in the colon of said animal to enhance bacterial activity and provide an acidic environment in said colon for trapping said nitrogenous wastes for excretion through the feces of said animal.

2. The process of claim 1 wherein said pet food composition contains from 2 to 9 weight percent of supplemental total dietary fiber of said fermentable fibers.

3. The process of claim 1 wherein said pet food composition contains from 3 to 7 weight percent of supplemental total dietary fiber of said fermentable fibers.

4. The process of claim 1 wherein said pet food composition contains from 4 to 7 weight percent of supplemental total dietary fiber of said fermentable fibers.

5. The process of claim 1 wherein said fermentable fibers have an organic matter disappearance of 20 to 50 percent.

6. The process of claim 5 wherein said fermentable fibers have an organic matter disappearance of 30 to 40 percent.

7. The process of claim 1 wherein said fermentable fibers are selected from the group consisting of beet pulp, gum arabic, gum talha, psyllium, rice bran, carob bean gum, citrus pulp, pectin, fructooligosaccharides, mannanoligosaccharides, and mixtures thereof.

8. The process of claim 1 wherein said fermentable fibers are selected from the group consisting of beet pulp, gum arabic and fructooligosaccharides.

9. The process of claim 1 wherein said fermentable fibers are beet pulp.

10. The process of claim 1 wherein said fermentable fibers comprise a blend of beet pulp, gum talha and fructooligosaccharides.

11. A process for lowering blood plasma ammonia concentrations in a companion animal with hepatic disease comprising the steps of:
    feeding said companion animal a diet consisting essentially of a pet food composition containing at least 18 wt % protein (dry matter basis) and fermentable fibers which have an organic matter disappearance of from about 15 to about 60 percent when fermented by fecal bacteria for a 24 hour period, said fibers being present in amounts from about 1 to about 11 percent by weight of supplemental total dietary fiber.

12. The process of claim 11 wherein said pet food composition contains from 2 to 9 weight percent of supplemental total dietary fiber of said fermentable fibers.

13. The process of claim 11 wherein said pet food composition contains from 3 to 7 weight percent of supplemental total dietary fiber of said fermentable fibers.

14. The process of claim 11 wherein said pet food composition contains from 4 to 7 weight percent of supplemental total dietary fiber of said fermentable fibers.

15. The process of claim 11 wherein said fermentable fibers have an organic matter disappearance of 20 to 50 percent.

16. The process of claim 15 wherein said fermentable fibers have an organic matter disappearance of 30 to 40 percent.

17. The process of claim 11 wherein said fermentable fibers are selected from the group consisting of beet pulp, gum arabic, gum talha, psyllium, rice bran, carob bean gum, citrus pulp, pectin, fructooligosaccharides, mannanoligosaccharides, and mixtures thereof.

18. The process of claim 11 wherein said fermentable fibers are selected from the group consisting of beet pulp, gum arabic and fructooligosaccharides.

19. The process of claim 11 wherein said fermentable fibers are beet pulp.

20. The process of claim 11 wherein said fermentable fibers comprise a blend of beet pulp, gum talha and fructooligosaccharides.

21. The process of claim 1 wherein said companion animal suffers from hyperammonemia.

22. The process of claim 11 wherein said companion animal suffers from hyperammonemia.

23. The process of claim 1 wherein said companion animal is a dog.

24. The process of claim 11 wherein said companion animal is a dog.

* * * * *